US008333282B2

(12) United States Patent
Pallmann

(10) Patent No.: US 8,333,282 B2
(45) Date of Patent: Dec. 18, 2012

(54) DEVICE FOR DEWATERING OF BULK OR FREE-FLOWING INPUT MATERIAL BY COMPRESSION

(75) Inventor: Hartmut Pallmann, Zweibrücken (DE)

(73) Assignee: Pallmann Maschinenfabrik GmbH & Co. KG, Zweibruecken (DE)

( * ) Notice: Subject to any disclaimer, the term of this patent is extended or adjusted under 35 U.S.C. 154(b) by 1254 days.

(21) Appl. No.: 12/119,628

(22) Filed: May 13, 2008

(65) Prior Publication Data

US 2008/0287277 A1 Nov. 20, 2008

(30) Foreign Application Priority Data

May 14, 2007 (DE) ..................... 20 2007 007 038 U

(51) Int. Cl.
*B30B 9/14* (2006.01)
*B01D 29/56* (2006.01)
*B01D 29/64* (2006.01)

(52) U.S. Cl. ......................... 210/415; 210/314; 100/117

(58) Field of Classification Search .................. 210/415, 210/314; 100/117
See application file for complete search history.

(56) References Cited

U.S. PATENT DOCUMENTS

| | | | | | |
|---|---|---|---|---|---|
| 1,096,199 | A | * | 5/1914 | Schuyler | 100/73 |
| 1,696,401 | A | * | 12/1928 | Hiller | 100/150 |
| 2,004,408 | A | * | 6/1935 | Hiller | 100/98 R |
| 2,103,483 | A | * | 12/1937 | McNeal | 210/330 |
| 2,199,709 | A | * | 5/1940 | McNeal | 210/499 |
| 2,419,545 | A | * | 4/1947 | Gray et al. | 426/481 |
| 2,607,679 | A | * | 8/1952 | Weiss et al. | 100/98 R |
| 3,135,193 | A | * | 6/1964 | Hunt | 100/117 |
| 3,938,434 | A | * | 2/1976 | Cox | 100/117 |
| 4,150,617 | A | * | 4/1979 | Schramm et al. | 100/117 |
| 4,155,299 | A | * | 5/1979 | Tuttle | 100/117 |
| 4,177,234 | A | * | 12/1979 | Lowry | 264/140 |
| 5,009,795 | A | * | 4/1991 | Eichler | 210/744 |
| 5,833,851 | A | * | 11/1998 | Adams et al. | 210/413 |

FOREIGN PATENT DOCUMENTS

JP 01083398 A * 3/1989

* cited by examiner

*Primary Examiner* — Thomas M Lithgow

(74) *Attorney, Agent, or Firm* — Muncy, Geissler, Olds & Lowe, PLLC

(57) ABSTRACT

A device for dewatering bulk or free-flowing input material by compacting it is provided. The device has a housing arranged along an axis of rotation, which has an input area and a feed and compaction area following axially within a jacket pipe. In the housing, a coaxial drive shaft with circumferentially extending coils rotates, compacting the input material during transport from the input area through the feed and compaction area. In this process the residual water present in the input material is conducted through radial openings in the jacket pipe from the device. According to the invention it is provided that at least in a partial region the jacket pipe is provided with passages and inside the jacket pipe an inner pipe is arranged, which lies at least partially with its external circumference against the inner circumference of the outer jacket pipe and which at least in the area of the passages has passage openings that are several fold smaller than the passages in the jacket pipe.

20 Claims, 5 Drawing Sheets

DEVICE FOR DEWATERING OF BULK OR FREE-FLOWING INPUT MATERIAL BY COMPRESSION

This nonprovisional application claims priority under 35 U.S.C. §119(a) to German Patent Application No. DE 202007 007 038.1, which was filed in Germany on May 14, 2007, and which is herein incorporated by reference.

BACKGROUND OF THE INVENTION

1. Field of the Invention

The invention relates to a device for dewatering bulk or free-flowing input material by compression.

2. Description of the Background Art

Within system and process engineering, a starting material is generally processed during its successive treatment to the desired final product. As a general rule, this is done stepwise during its passage through different processing stations.

An example of such a type of processing is the workup of lignocellulose-containing material, such as wood, annual plants, straw, bagasse, and the like. In such processes, the processing stations of pre-grinding, washing, pre-steaming, dewatering, cooking, defibration, drying, and separation are passed through. The fibers obtained in this way can then be used to produce pulp in paper manufacturing or as wood fibers in the manufacturing of wood fiber production, for example of MDF products.

The invention is based on a device with which the input material is dewatered by compressing it. In the above-described process, such a device can, for example, be arranged as a plug screw in front of a cooker with the function of making possible the introduction of the free-flowing input material into a subsequently pressurized system with simultaneous dewatering of the input material.

The theoretical design of such a device provides a housing with a jacket pipe, in which a screw shaft with a circumferential helix rotates, which in cooperation with axially aligned feed strips transports the still loose input material to the opposite end of the jacket pipe. As a result of the jacket pipe tapering conically toward this end or the decreasing pitch of the screw helix, the input material is strongly compressed and the residual water present in the input material is squeezed out. The removal of the squeezed-out water takes place through openings in the jacket pipe, which are adapted in their size and shape to the type of input material.

In addition to the squeezing out of the residual water, the compression of the input material also serves to create a highly compressed material plug, which ensures sealing of the inlet opening against the pressurized cooker system.

One drawback of such devices results from the high compression of the input material, resulting in higher compression forces on the inside of the screw jacket. These cause high abrasion both on the screw helix and on the jacket pipe, so that known devices must be repaired or reinforced at regular intervals. The resulting shutdown times and work reduce the economical operation of such devices.

An additional drawback results from the fixed geometry of the elements involved in the dewatering, which makes adaptation of known devices to the uniqueness of varying input materials impossible.

SUMMARY OF THE INVENTION

It is therefore an object of the invention to further develop a device for dewatering bulk or free-flowing input material.

In an embodiment, an inner jacket surface of the device, at least in the areas subject to high stress, is designed to be simply and rapidly replaceable. This is accomplished by separating the functional components into those with static supporting function and those with dewatering function. The supporting function is performed by the solid housing or jacket pipe of the device, which is provided with relatively large passages in view of the nature of the input material. The dewatering function, in other words, the separation of the input material from the squeezed-out water, is the job of the relatively slender inner pipe, which is supported against the inner circumference of the jacket pipe in the area of the passages, has passage openings for the squeezed-out water adapted to the nature of the input material. This division of functions makes possible the tailor-made adaptation of a device in accordance with the invention, both to static and also to process-related requirements, with the goal of optimizing both the structure and the quality of the processing.

In contrast to the conventional art, where the passage openings have a dimensional character because of the thickness of the jacket pipe and very small particles in the input material entail the risk of clogging of the openings, the very slender design of the parts guaranteeing the dewatering function results in an essentially two-dimensional dewatering surface, with which clogging of the openings is not to be expected. This effect is further increased through the formation of the passage openings as stepped holes. As a result, it is possible to select the cross section of the passage openings to be smaller overall, and thus to reduce proportionately the fraction of solid particles passing through the passage openings.

Since the parts forming the inner jacket surface are very slim in design, they can be made of high-strength material without greatly increasing the manufacturing costs, and therefore combat an excessively rapid wear. The longer useful lives of the machinery and longer maintenance intervals result in an additional economic advantage for the operator of devices in accordance with the invention.

In the interplay of the aforementioned functional components, it has been proven advantageous if the areas of the passage openings in the inner pipe amount to about 20% to 40%, preferably 25% to 30% of the cross sectional area of the passage openings in the jacket pipe and the plug screw. This results in establishment of a balanced ratio between adequate strength and high dewatering performance.

In practice, passage openings with diameters of 2 mm to 10 mm, preferably 4 mm to 8 mm, have proven suitable. However, other diameter ranges are likewise within the scope of the invention.

It has proven advantageous to form the passage openings in such a way that these expand in the passage direction, which can be accomplished in a conical or stepwise fashion. In this way the flow-through resistance decreases in a radially outward direction, which promotes the removal of the squeezed-out water and prevents clogging of the passage openings.

To minimize wear, according to an example embodiment, it is sufficient to design the device in accordance with the invention only in the end area of the jacket pipe or in the area of the plug pipe, since these are the areas of greatest compaction and thus the greatest wear.

In embodiments of the invention with a bearing pin at the end of the drive shaft, the compaction in the area of the plug pipe can be systematically influenced by a corresponding pin shape. For example, the compaction is increased by a bearing pin that expands conically in the direction of movement. A diameter of the bearing pin that decreases gradually toward the end can allow for gradual reduction of pressure on the input material, whereas a cylindrical bearing pin has neutral behavior.

In addition, it is advantageous to design the end of the jacket pipe as an independent component in the form of a plug pipe, which facilitates maintenance and repair work.

In a simple embodiment of the invention, the inner pipe is screwed together with the jacket pipe or plug pipe to impede relative movements of the two parts with respect to one another. An advantageous alternative with respect to rapid installation or replacement of the inner pipe is provided by form-locking means that to be sure, permit axial sliding-in of the inner pipe, but block rotation relative to the jacket pipe. Movement of the inner pipe relative to the jacket pipe in the axial direction is prevented by stops.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
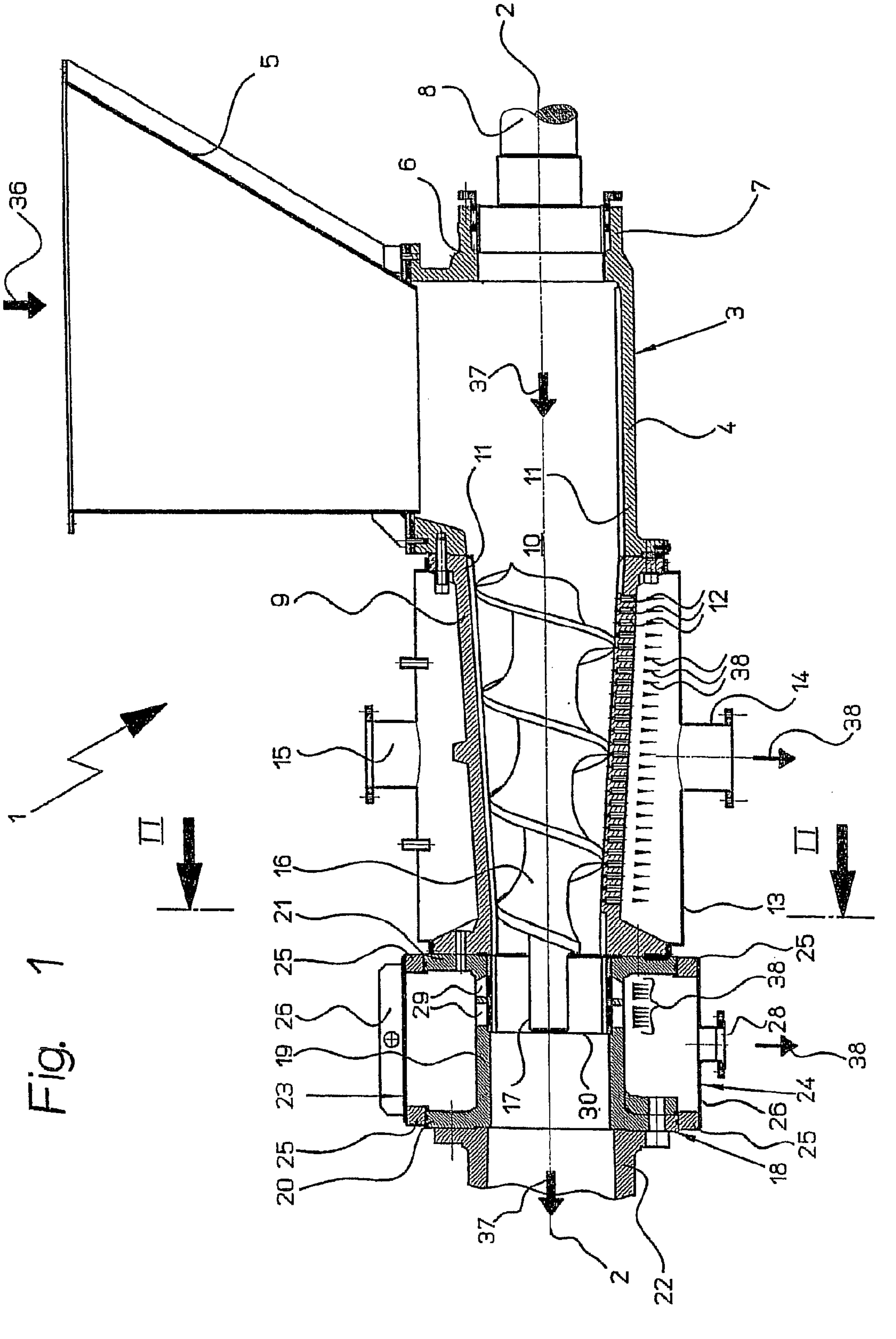
FIG. 1 illustrates a vertical longitudinal section through a device in accordance with an embodiment of the invention.

FIG. 1 shows a device, in accordance with an embodiment of the invention, in the form of a plug screw 1 with a housing 3 arranged around a horizontal axis of rotation 2. The housing 3 comprises a cylindrical input area 4, into which an input hopper 5 opens from above. The front-end housing closure 6 of the housing 3 is equipped as a shaft lead-through 7 with bearings for a drive shaft 8 extending along the axis of rotation 2. The drive shaft 8 with its end located outside the housing 3 leads to a rotary drive means, not shown in further detail.

A conically tapered jacket pipe 9, fastened coaxially at the cylindrical input area 4 via ring flanges, is fastened to the side of the cylindrical input area 4 opposite the housing closure 6. In this way a continuous feeding and compaction chamber 10 results in the axial direction along the axis of rotation 2. On the inner surfaces delimiting the feeding and compaction chamber 10 one can see approximately axially aligned conveying grooves 11, which are distributed uniformly over the inner circumference. In addition, radial dewatering openings 12 are introduced into the jacket pipe 11, over which the squeezed-out water is conducted from the input material.

The dewatering pipe 9 is surrounded on the circumferential side by a cylindrical metal sheet 13, which in this way forms a collecting channel for the squeezed-out water labeled as 38. At its base can be seen an outlet 14 for the squeezed-out water and at its apex an outlet 15 for exiting air and exiting steam.

In the feeding and compaction chamber 10 along the axis of rotation 2, the drive shaft 8 extends, and a coil 16 runs helically along its circumference. Corresponding to the course of the jacket pipe 9 in the feeding and compaction chamber 10, the external diameter of the coil 16 decreases and, to ensure the axial transport of the input material, acts together with the feed strips 11 on the inner circumference of the feeding and compaction chamber 10.

The end of the drive shaft 8 forms a bearing pin 17, which is surrounded by a so-called plug pipe 18. The plug pipe 18 represents the axial extension of the jacket pipe 9 and has the task of accomplishing a tight and pressure-resistant connection to the upstream areas of the process engineering, for example a cooker operated at elevated pressure. The connection is formed by highly compacted input material, forming a plug, which simultaneously forms the radial bearing for the bearing pin 17.

Figure 2:
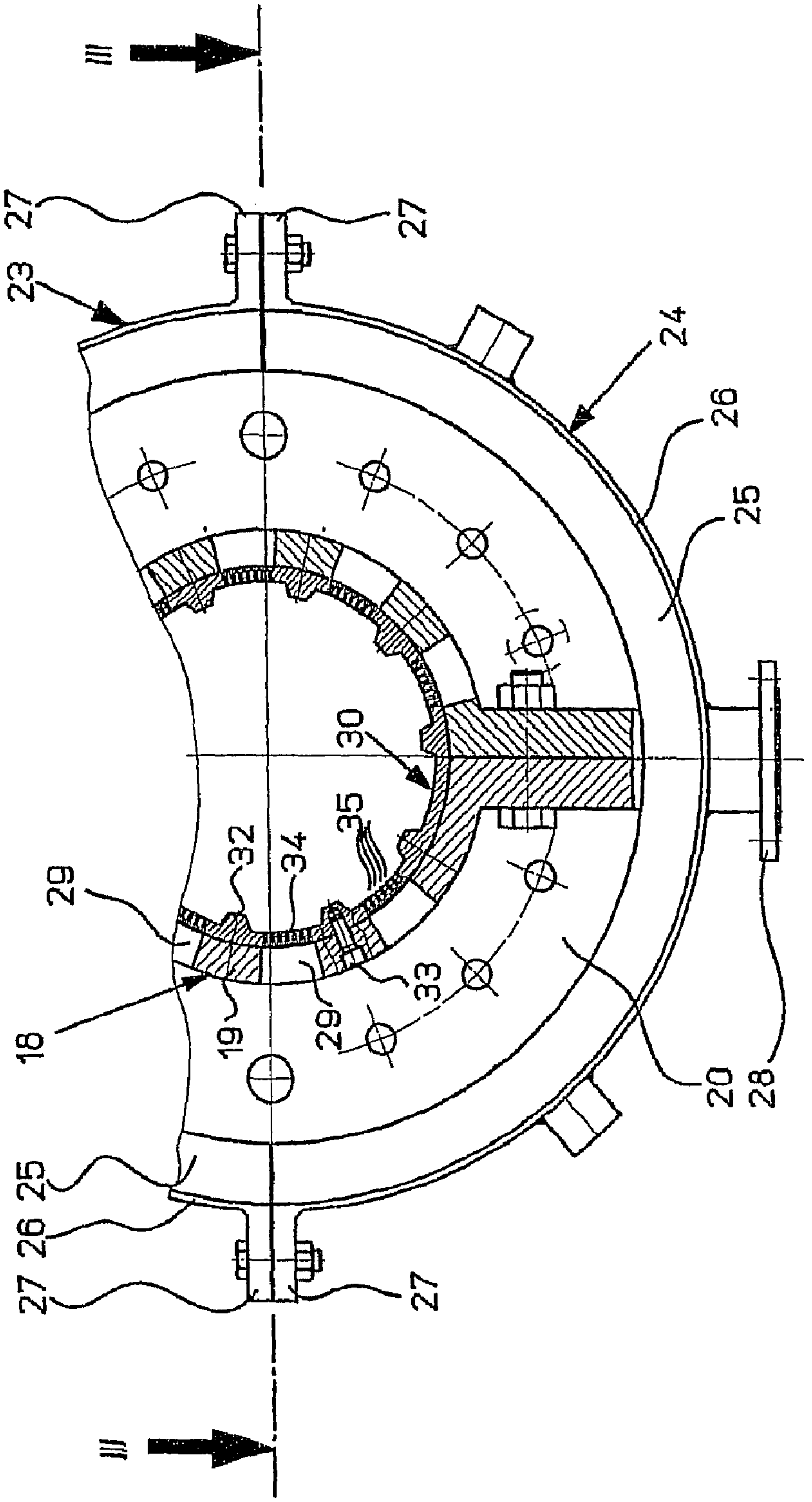
FIG. 2 illustrates a vertical cross section through the device shown in FIG. 1 along line II-II.
Figure 3:
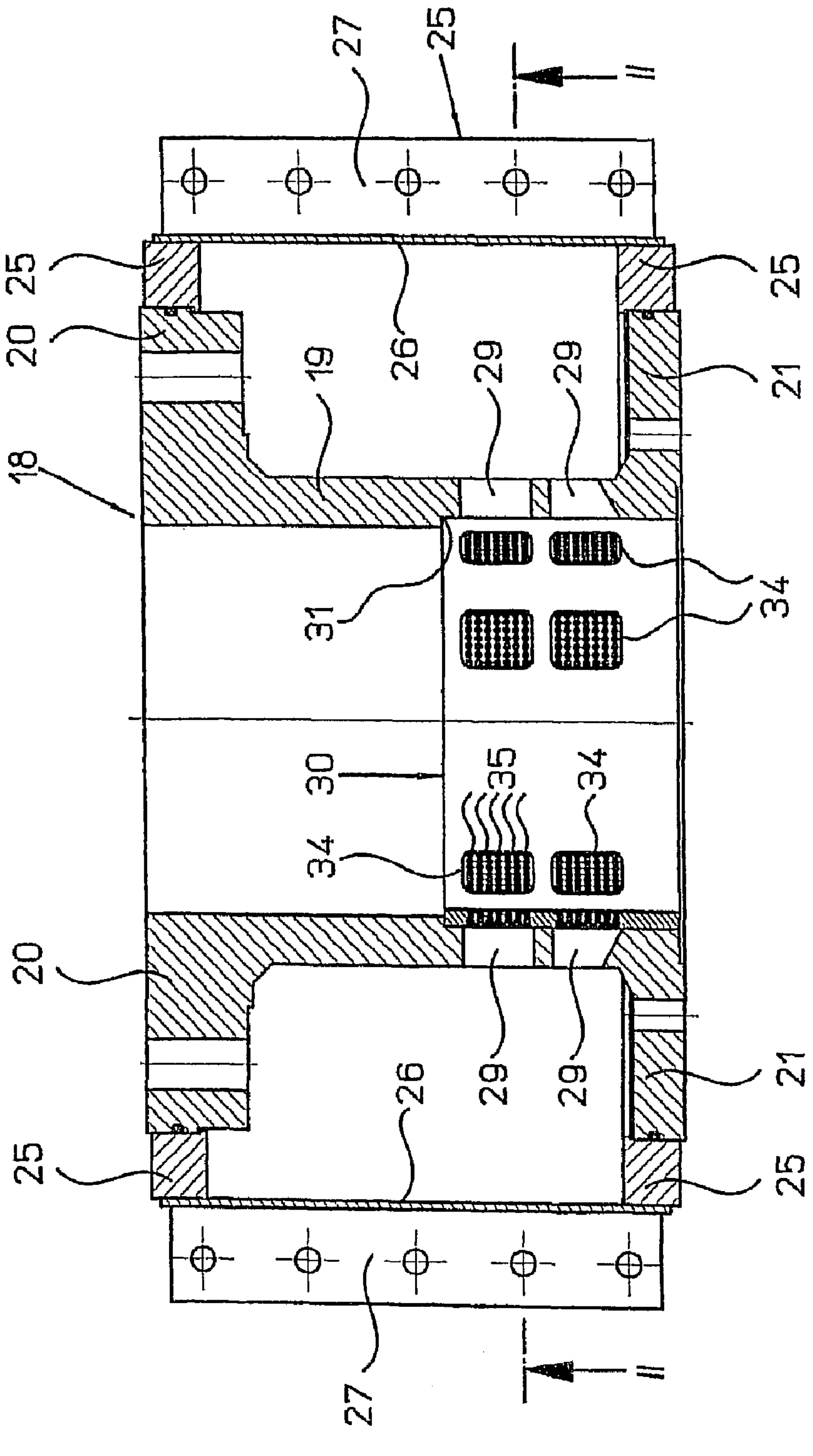
FIG. 3 illustrates a horizontal longitudinal section through the area shown in FIG. 2 along line III-III.

The more detailed design of the plug pipe 18 is also apparent from FIGS. 2 and 3, from which it is apparent that the plug pin 18 has a pipe section 19, formed from two half-shells, coaxial to the axis of rotation 2, at each of the two ends of which an annular flange 20 and 21 is formed on. The annular flanges 20 and 21 serve on one hand for connecting the plug pipe 17 to an annular flange attached at the end of the jacket pipe 9 and on the other hand to create a fastening possibility for a connecting line 22 for conducting the compacted input material further to subsequent processing stations.

The annular flanges 20 and 21 are surrounded on the peripheral side by two half-shell shaped trays 23 and 24, which can be put together to make a cylindrical structure. Each of the trays 23 and 24 comprises two supporting profiles 25, on the outer circumference of which a round metal sheet 26 is fastened. The trays can be assembled over opposing longitudinal flanges 27 to make a hollow cylinder, which in the finished state completely surrounds the plug pipe 18 and into which squeezed-out water 38 enters from the input material. In the base area of the lower tray 24 an outlet 28 for carrying off the collected squeezed-out water 38 is visible.

In the axial overlapping area with the bearing pin 17, the pipe section 19 of the plug pipe 18 has radial passages 29 of rectangular shape, resulting in a perforated grid structure in a small space. The passages 29 assigned to the end of the jacket pipe 9 can also taper toward the outside over the wall thickness of the pipe section 19.

In the area of the passages 29, the pipe section 19 is machined out on its inner circumference, so that a graded enlargement of the inner diameter results. This serves to accommodate an inner pipe 30, which in this way can be slid into the plug pipe 18 until it comes to rest with its front end on the annular shoulder 31 formed by the step. In this process, the inner pipe 30 at the other end fits flush with the front face of the plug pipe 18.

Advantageously, the inner pipe 30 can be made in a single piece for fast assembly and disassembly, or can be made up of two half-shells, and includes an abrasion-resistant material. Along its inner circumference in an extension of the feed strips 11, additional feed strips 32 are visible. The fastening and positional securing of the inner pipe 30 in the plug pipe 18 takes place via screws 33, which extend radially through the cylindrical pipe section 19 of the plug pipe 18 and mesh with their threads in threaded borings that extend into the cross sectional area of the feed ribs 32 in the inner pipe 30. In this way the tension from the screws 33 is distributed over a large area via the feed ribs 32 to the inner pipe 30.

The inner pipe 30 has a plurality of dewatering areas 34 which are distributed over the circumference congruently to the passages 29. Each dewatering area 34 has a plurality of passage openings 35 arranged with respect to one another in the manner of a sieve, through which the squeezed-out water 38 passes from the plug pipe 18. The passages 29 and the passage openings 35 thus work together in removing the squeezed-out water 38.

In the operation of the device in accordance with the invention, the input material, as indicated by the arrow 36, is loosely fed into the input hopper 5, in which it moves downward under the influence of gravity and enters the intake zone of the plug screw 1. There it is picked up by the coils 16 and transported in the direction of the arrow 37. Through the conveyance and compaction chamber 10, continuously becoming smaller in the direction of movement 37, the input material is continuously compacted until it has its greatest packing density at the end of the jacket pipe 9. The water 38 initially squeezed out as a result of the increasing compaction passes over the dewatering openings 12 into the collecting tray formed by the cylindrical metal sheet 13 and is disposed of via the outlet 14.

To be able to withdraw additional water from the compacted input material, the possibility also exists for free water in the area of the inner pipe 30 and thus in the area with the greatest pressure to escape from the device through the passage openings 35 and radial passages 29, to collect in the tray 24, and to be conducted away over the outlet 28.

Figure 4:
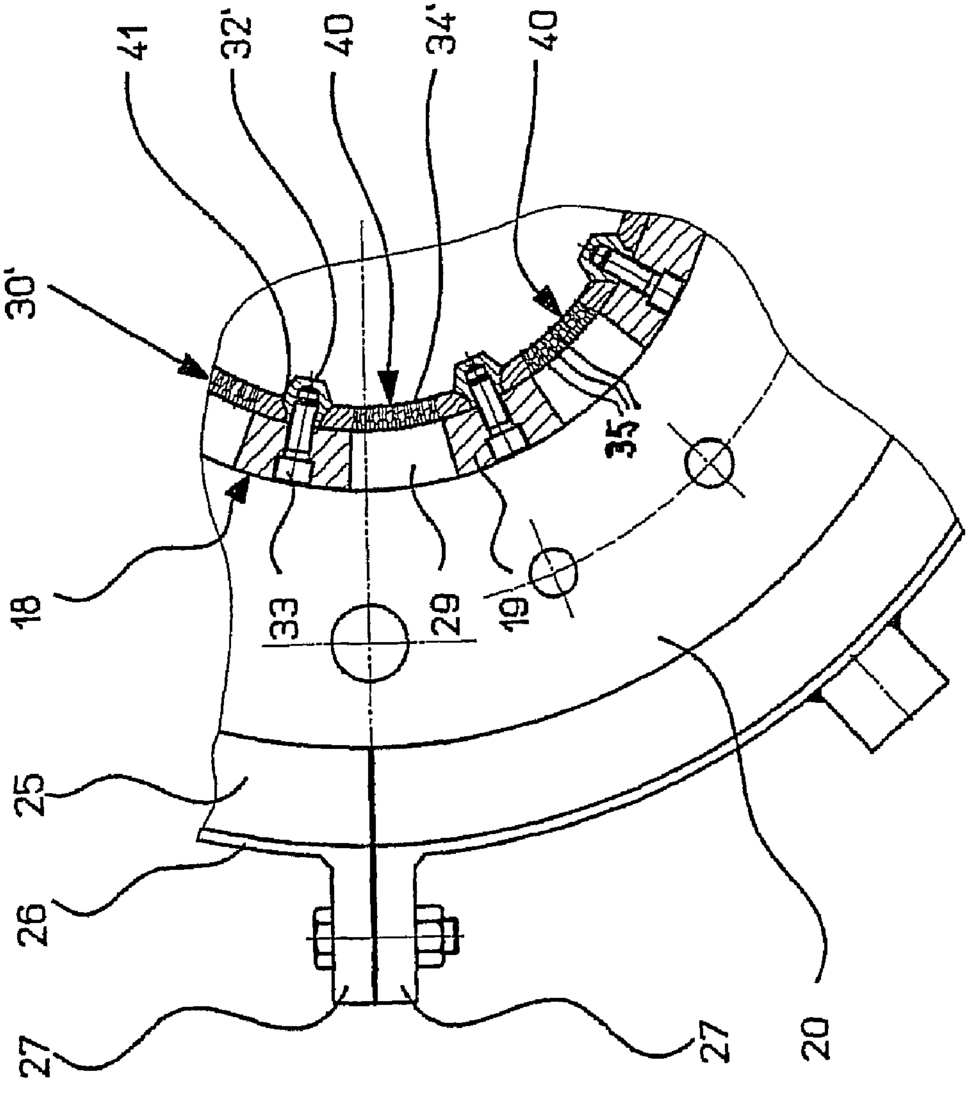
FIG. 4 illustrates a vertical partial cross section through another embodiment of the invention.

An embodiment of the invention with an alternative design of the inner pipe 30' is shown in FIG. 4. Otherwise FIG. 4 corresponds to the partial cross section shown in FIG. 2, so that the same reference numbers are used for identical parts.

The inner pipe 30' shown in FIG. 4 is made up essentially of strip-like arc segments 40, which are slid axially into the plug pipe until the dewatering areas 34' abut radially with the passages 29 in the plug pipe 18. The longitudinal edges 41 of the strip-like arc segments 40 are beveled.

The fastening of the arc segments 40 takes place by way of feed strips 32', likewise representing arc segments, which can be clamped radially outward by screws 33 against the inner jacket of the pipe segment 19. The foot area of the feed strips 32' tapers in the direction of its footprint on the inner circumference of the plug pipe 18, so that the sides of the feed strips 32 form wedge-shaped surfaces that interact with the beveled longitudinal edges 41 of the arc segments 40. Upon tightening the screws 33, consequently a clamping effect of the arc segments 40 takes place, guaranteeing that these will be securely seated within the plug pipe 18. This type of fastening has the advantage that individual arc segments 40 may also be replaced.

Figure 5:
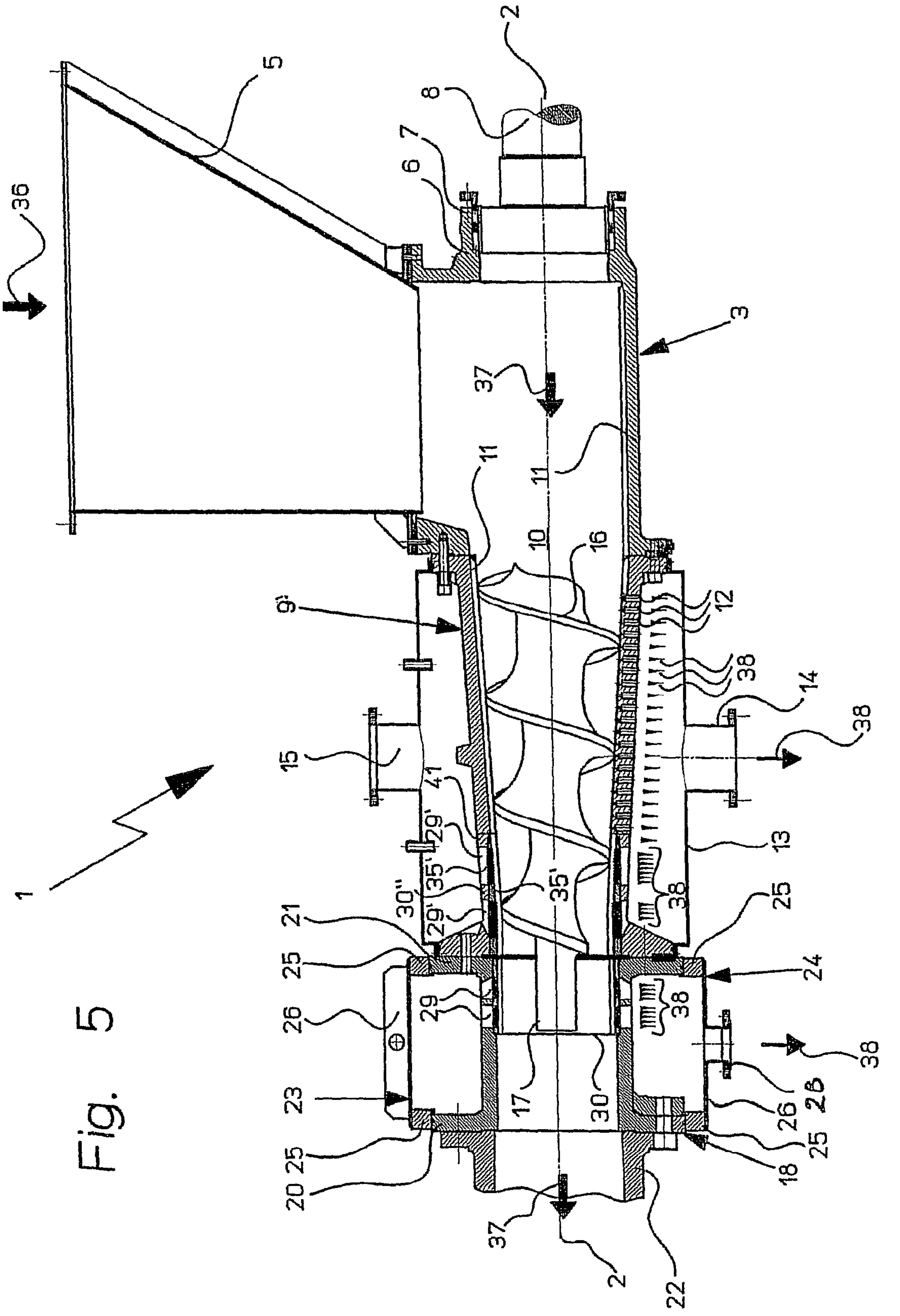
FIG. 5 illustrates a vertical longitudinal section through an additional embodiment of a device in accordance with the invention.

FIG. 5 relates to a device largely identical to the plug screw 1, so that once again the same reference numbers pertain to the same parts. Differences exist only in the end area of the jacket pipe 9', approximately the last one third of which in the feed direction 38 is formed by a pipe section 41 with passages 29' comparable to the pipe section 41. Within the pipe section 41 one can see an inner pipe 30" comparable to the inner pipe 30 in design and use. The inner pipe 30" has a plurality of dewatering areas 34" with passage openings 35', which abut in the radial direction with passages 29' in the jacket pipe 9'. Statements about construction details previously made under FIGS. 1 to 4 are also applicable here. This embodiment of the invention has the advantage that in addition to effective dewatering, simple and rapid replacement of the parts directly affected by abrasion, forming the inner circumference of the device, not only in the area of the bearing pin 17, but also in the last section of the jacket pipe 9' in which the drive shaft 8 is also covered with coils, is possible.

The invention also covers embodiments that are not shown, in which the shaft has no bearing pins and no plug pipe, and therefore compaction and dewatering in accordance with the invention only takes place in the last section of the jacket pipe.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for dewatering bulk or free-flowing input material by compacting it, a housing arranged along an axis of rotation, the housing having an input area and a feed and compaction area following axially within a jacket pipe, the jacket pipe having a first section toward the input area having radial passages and a second section adjacent the first section; and a drive shaft having circumferentially extending coils configured to rotate coaxially in the housing for compacting the input material during transport from the input area through the feed and compaction area, wherein residual water is conducted through the radial passages in the jacket pipe from the device, and wherein the jacket pipe second section is provided with an inner pipe that lies at least partially with its external circumference against the inner circumference of the jacket pipe and not in the jacket pipe first section, the inner pipe having openings that are smaller than the passages in the jacket pipe first section, and wherein in the jacket pipe second section, the drive shaft in the feed direction ends in a bearing pin that is free from coils and wherein the inner pipe and jacket pipe extend over the longitudinal section of a radial pin.

2. The device in accordance with claim 1, wherein a cross sectional surface of the openings is 20% to 40% of a cross sectional surface of the passages.

3. The device in accordance with claim 1, wherein the openings in the inner pipe have a diameter of 2 mm to 10 mm.

4. The device in accordance with claim 1, wherein the openings are formed from stepped holes having a larger diameter towards the radially outward area.

5. The device in accordance with claim 1, wherein the passages are distributed in several radial planes over a circumference of the jacket pipe.

6. The device in accordance with claim 1, wherein the second section includes the approximately last one-third in the feed direction of the longitudinal section of the drive shaft equipped with a coil.

7. The device in accordance with claim 1, wherein the first section of the jacket pipe has a diameter that is larger than a diameter of the second section of the jacket pipe.

8. The device in accordance with claim 1, wherein feed strips are provided on an inner circumference of the inner pipe.

9. The device in accordance with claim 8, wherein the bearing pin is cylindrical or conical with respect to the axis of rotation.

10. The device in accordance with claim 1, wherein the longitudinal section of the jacket pipe surrounding the radial pin is formed from a pipe that is fastened coaxially to the device.

11. The device in accordance with claim 1, wherein the inner pipe is made in one piece or is composed of half-shells.

12. The device in accordance with claim 1, wherein the inner pipe is fastened with radial screws to the jacket pipe, an end of which that is opposite the screw head extends into axially extending feed strips on an inside of the inner pipe.

13. The device in accordance with claim 1, wherein a form-locking component for creating an axial guidance is formed in a contact surface between the inner pipe and the jacket pipe, the form-locking component including a groove and spring.

14. The device in accordance with claim 1, wherein the inner pipe, based on the cross section, is divided into annular segments, every other annular segment of which has undercut longitudinal sides for clamping fastening of adjacent segments and the annular segments with undercut longitudinal sides can be fastened with radial screws on the inner circumference of the jacket pipe.

15. The device in accordance with claim 14, wherein the annular segments with undercut longitudinal sides have feed strips on their surface forming the inner circumference of the inner pipe.

16. The device in accordance with claim 14, wherein the passage openings are arranged in the clamped annular segments.

17. The device in accordance with claim 1, wherein the inner pipe is secured against longitudinal movement by an axial stop.

18. The device in accordance with claim 17, wherein the stop is formed by an annular shoulder on the inside of the jacket pipe or pipe.

19. The device in accordance with claim 1, wherein a radial length of the openings is less than a radial length of the radial passages in the jacket pipe.

20. A device for dewatering bulk or free-flowing input material by compacting it, a housing arranged along an axis of rotation, the housing having an input area and a feed and compaction area following axially within a jacket pipe, the jacket pipe having a first section toward the input area having radial passages and a second section adjacent the first section; and a drive shaft having circumferentially extending coils configured to rotate coaxially in the housing for compacting the input material during transport from the input area through the feed and compaction area, wherein residual water is conducted through the radial passages in the jacket pipe from the device, wherein the jacket pipe second section is provided with an inner pipe that lies at least partially with its external circumference against the inner circumference of the jacket pipe and not in the jacket pipe first section, the inner pipe having openings that are smaller than the passages in the jacket pipe first section, and wherein drive shaft includes a bearing pin free of the coils located in the second section and wherein the second section does not extend over the coils.

* * * * *